United States Patent [19]
Tirrell et al.

[11] Patent Number: 5,533,311
[45] Date of Patent: Jul. 9, 1996

[54] THERMOFORMED PLASTIC REFRIGERATOR DOOR

[75] Inventors: Steven G. Tirrell, Dahinda; Theodore A. Becker, Oneida; Kenneth M. Hattori, Galesburg, all of Ill.; Samuel C. Crosby, Lilburn; Michael C. Mayne, Conyers, both of Ga.

[73] Assignee: Maytag Corporation, Newton, Iowa

[21] Appl. No.: 315,507

[22] Filed: Sep. 30, 1994

[51] Int. Cl.⁶ ..................................................... E06B 5/00
[52] U.S. Cl. ............... 52/309.9; 52/784.13; 52/784.15; 52/784.16; 52/792.1; 49/501; 312/405
[58] Field of Search ............. 52/784.1, 784.13–784.16, 52/783.1, 792.1, 793.1, 309.9, 309.1; 49/501; 312/405, 405.1, 406.2, 321.5

[56] References Cited

U.S. PATENT DOCUMENTS

| | | |
|---|---|---|
| 1,388,124 | 8/1921 | Roberts. |
| 2,012,262 | 8/1935 | Forsthoefel ................... 312/321.5 X |
| 3,091,946 | 6/1963 | Kesling. |
| 3,286,004 | 11/1966 | Hill et al.. |
| 3,634,971 | 1/1972 | Kesling ............................. 49/501 X |
| 3,732,646 | 5/1973 | Horvay et al. ................... 49/501 X |
| 3,882,637 | 5/1975 | Lindenschmidt ..................... 49/501 |
| 4,192,701 | 3/1980 | Martin et al.. |
| 4,496,201 | 1/1985 | Allgeyer ............................. 49/501 X |
| 4,583,796 | 4/1986 | Nakajima et al. ............. 52/784.13 X |
| 5,108,529 | 4/1992 | Shuert. |
| 5,168,621 | 12/1992 | Kruck et al.. |
| 5,306,082 | 4/1994 | Karlin et al.. |
| 5,374,118 | 12/1994 | Kruck et al.. |

FOREIGN PATENT DOCUMENTS 1410215  10/1975  United Kingdom.

OTHER PUBLICATIONS

"Revolution in Refrigerators", Appliance Manufacturer, Jun. 1994.

*Primary Examiner*—Robert J. Canfield
*Attorney, Agent, or Firm*—Bacon & Thomas

[57] ABSTRACT

A unitary plastic refrigerator door is produced by simultaneously thermoforming an outer refrigerator door panel with an inner refrigerator door liner. During production, an annular flange portion of the inner refrigerator door liner is joined with an annular sidewall portion of the outer refrigerator door panel at an attachment location positioned inwardly of the annular side wall portion. The inner refrigerator door liner is also formed with either an annular recess or a plurality of spaced recesses in its annular flange portion adjacent the attachment location of the inner refrigerator door liner and the outer refrigerator door panel that is adapted to press-fittingly receive a door gasket. Preferably, the outer refrigerator door panel includes a thickened portion that is formed with a handle defining recess. A method of thermoforming the refrigerator door is also provided and advantageously enables the inner refrigerator door liner to be produced on a male mold member.

8 Claims, 13 Drawing Sheets

THERMOFORMED PLASTIC REFRIGERATOR DOOR

BACKGROUND OF THE INVENTION

1. Field of the Invention

The present invention pertains to the art of refrigerators and, more specifically, to a unitary plastic refrigerator door, as well as a method of thermoforming the plastic refrigerator door from two plastic sheets.

2. Discussion of the Prior Art

Figure 1:
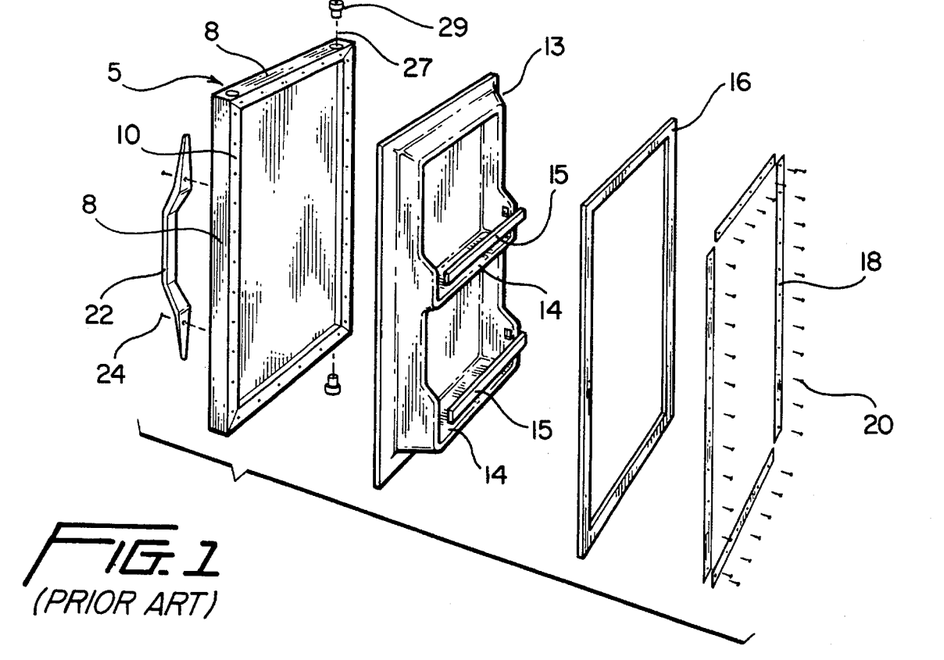
FIG. 1 is an exploded view of a refrigerator door constructed in accordance with the prior art.

It is commonly known to produce a refrigerator door by independently manufacturing the various components that combine to make the door and then, in a separate manufacturing step, assembling the various components. For example, as represented in FIG. 1 of this application, it is common to form an outer refrigerator door panel 5 from a single stamped sheet of metal which is folded in order to form sides 8 and inwardly turned flanges 10. The inner liner 13 associated with such a refrigerator door is often thermoformed on a male mold member. In general, such an inner liner 13 is made on the male mold member because of the high draw ratios that would be involved with the use of a female mold member. Once the outer refrigerator door panel 5 and the inner refrigerator door liner 13 are formed, inner liner 13 is secured to door panel 5 along flanges 10, along with an annular gasket 16, by means of a plurality of connecting strips 18 and screws 20. A separate handle 22 is then secured to outer refrigerator door panel 5 by means of screws 24. Outer refrigerator door panel 5 is also generally formed with upper and lower aligned holes 27 which are adapted to receive pivot bushings 29 for mounting the assembled refrigerator door to a refrigerator cabinet. For insulation purposes, it is also known to inject foam between refrigerator door panel 5 and inner liner 13 after complete assembly of the refrigerator door.

The manufacturing procedure associated with constructing such a refrigerator door formed from various, individually produced components which are later assembled together, is inefficient. Such a process is extremely time consuming and requires various manufacturing stages wherein the individual components are made and assembled. In addition, since the outer refrigerator door panel 5 is made of metal, its outer surface must be painted for aesthetic purposes. The need for these multiple manufacturing stages obviously increases the overall costs associated with manufacturing such a refrigerator door.

Figure 2:
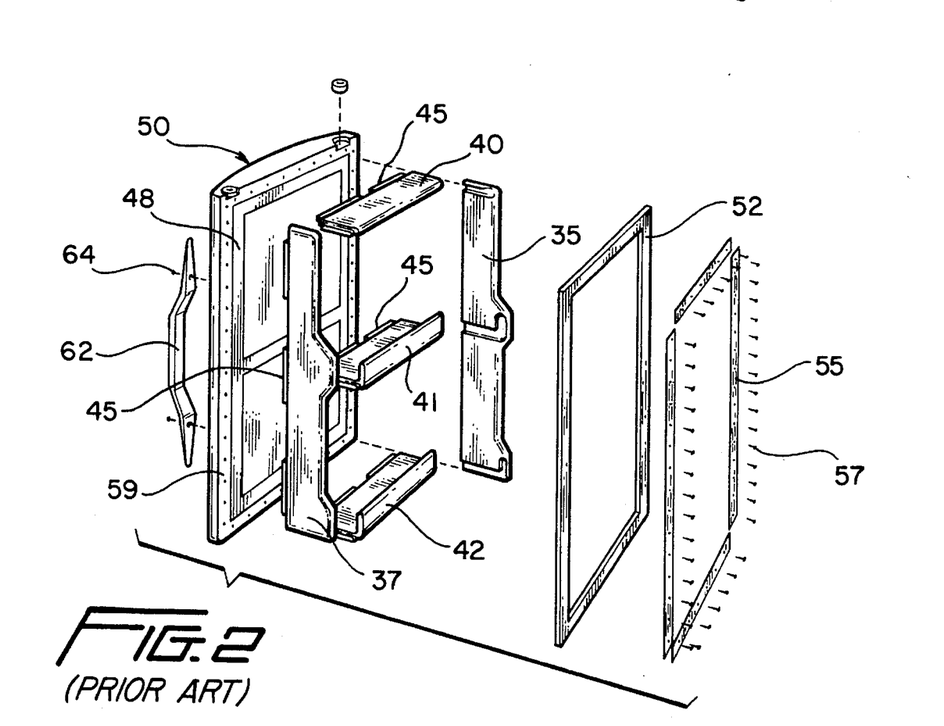
FIG. 2 is an exploded view of another refrigerator door constructed in accordance with the prior art.
Figure 3A:
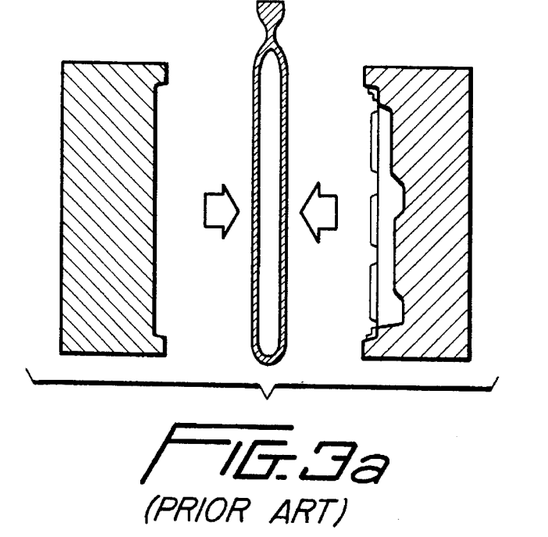
FIG. 3a is a cross-sectional view of a molding device used to make the refrigerator door FIG. 2 in its open state.
Figure 3B:
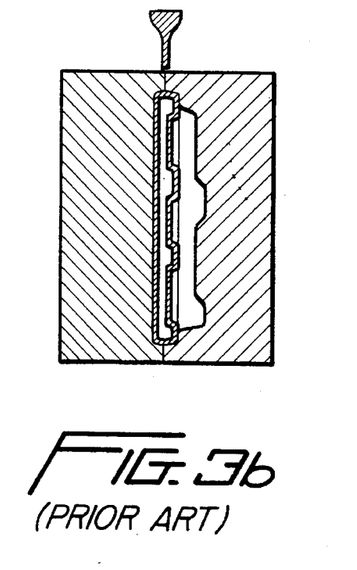
FIG. 3b is a cross-sectional view of a molding device of FIG. 3a in its closed state.

It is also been proposed to manufacture a hollow refrigerator door formed entirely from plastic. Such an arrangement is generally shown in FIGS. 2, 3a and 3b and disclosed in U.S. Pat. No. 5,306,082. According to this method of making a refrigerator door, the first step in the manufacturing process involves independently making the individual components which combine to form the inner door members. As shown in FIG. 2, these inner components generally constitute opposing side members 35, 37 and a plurality of shelf defining members 40–42. In general, these interior components are separately blow molded by arranging two parallel sheets of plastic between first and second mold members (see FIGS. 3a and 3b), closing the mold members so as to pinch the sheets about outer perimeters thereof and injecting air between the sheets so as to cause the sheets to expand against the mold members. Side members 35, 37 and shelf members 40–42 are formed with tabs 45 which are adapted to extend within slots 48 formed in an outer door panel 50 that is constituted by a hollow plastic slab which is also blow molded. In a final stage of the blow molding of the outer door panel 50, the tabs 45 provided on side members 35, 37 and shelf members 40–42 are positioned within slots 48 such that slots 48 form about tabs 45 in order to secure side members 35, 37 and shelf members 40–42 to outer door panel 50. An annular gasket 52 is then secured by means of connecting strips 55 and screws 57 to an outer annular flange portion 59 of door panel 50. In addition, a separate handle 62 is secured to door panel 50 by means of screws 64.

The refrigerator door construction arrangement as represented by FIGS. 2, 3a and 3b has several advantages over the construction arrangement represented in FIG. 1 and discussed above. First, the entire refrigerator door of the FIG. 2 arrangement is formed from plastic and therefore its desired shape can be readily varied. In addition, such a manufacturing operation does not require a subsequent painting stage for outer door panel 50. Furthermore, making the outer door panel 50 from plastic can provide some additional heat efficiency benefits since the metal door panel of the FIG. 1 arrangement will be a better conductor of heat into the refrigerator than the plastic door. Finally, the use of plastic presents the ability to integrally form the outer door panel with a handle as also proposed in the prior art and represented in FIG. 4.

Figure 4:
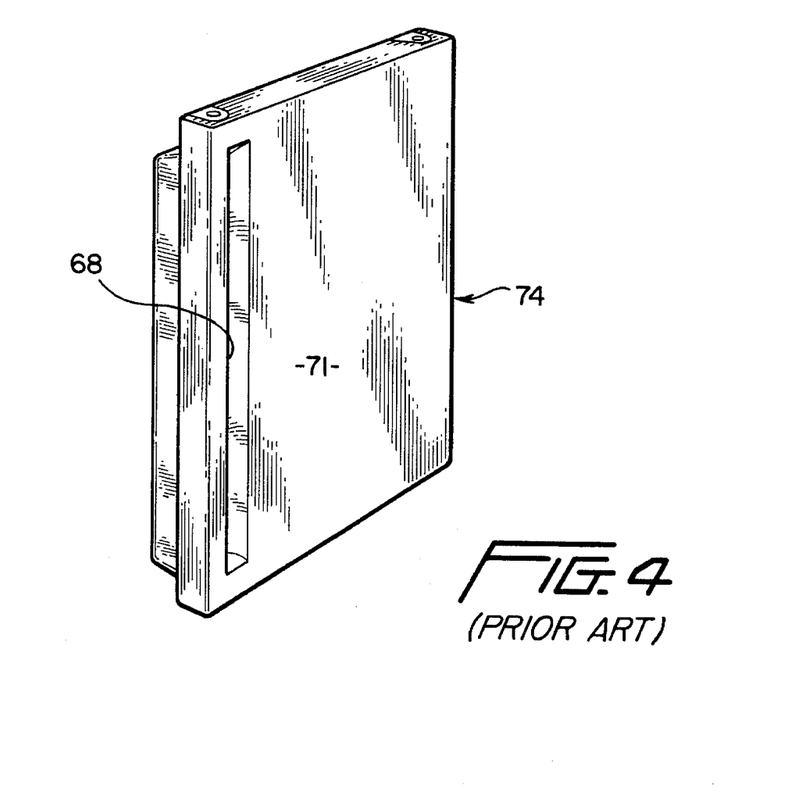
FIG. 4 is a perspective view of a still further plastic refrigerator door constructed in accordance with the prior art.

However, these previously proposed all-plastic refrigerator door arrangements suffer from various drawbacks. For example, the various components which make up each of the refrigerator doors are still separately manufactured and subsequently assembled. As indicated above, this is considered inefficient as it adds to the manufacturing time and cost associated with making such doors. Furthermore, the known all-plastic refrigerator door arrangements are generally not aesthetically appealing since the interconnection between the various components are often noticeably visible and there will be a pinch line where the mold halves close. Finally, although forming an outer door panel of plastic with an integrally formed handle reduces manufacturing costs associated with the outer door panel and is rather aesthetically appealing, the prior proposed system as represented in FIG. 4 forms the handle, generally indicated in 68, by creating a recess in the front surface 71 of the outer door panel 74 which inherently reduces the energy efficiency of the refrigerator door as a whole due to its reduced thickness. In addition, there is no practical way in the prior art to use different materials or colors for the inner and outer refrigerator door panels.

Therefore, there exists a need in the art for a plastic refrigerator door which can be produced in a minimum number of manufacturing stages so as to reduce the manufacturing costs associated with the refrigerator door. In addition, there exists a need in the art for a all-plastic refrigerator door and method of making the same wherein the energy efficiency associated with the refrigerator door is maintained or increased. Finally, there exists a need in the art for an aesthetically appealing plastic refrigerator door.

SUMMARY OF THE INVENTION

It is an object of the present invention to provide an improved all-plastic refrigerator door which minimizes the manufacturing stages and associated costs of producing such a door.

It is another object of the invention to produce a plastic refrigerator door including an integrally formed handle that does not reduce the overall energy efficiency characteristics of the refrigerator door.

It is a further object of the present invention to produce an aesthetically pleasing all-plastic refrigerator door.

These and other objects of the present invention are achieved by simultaneously thermoforming an outer refrigerator door panel with an inner refrigerator door liner. By this arrangement, an annular flange portion of the inner refrigerator door liner is joined with an annular sidewall portion of the outer refrigerator door panel at an attachment location positioned inwardly of the annular sidewall portion wherein the attachment location is not visible from the front and sides of the refrigerator door. The inner refrigerator door liner is also formed with either an annular recess or a plurality of spaced recesses in its annular flange portion adjacent the attachment location of the inner refrigerator door liner and the outer refrigerator door panel in order to press-fittingly receive a door gasket. Preferably, the outer refrigerator door panel includes a thickened portion that is formed with a handle defining recess located outside of the door shelf and side dike perimeter of the inner refrigerator door liner. A method of thermoforming the refrigerator door is also provided and advantageously enables the inner refrigerator door liner to be produced on a male mold member.

Other objects, features and advantages of the invention should become apparent from the following detailed description of a preferred embodiment thereof, when taken in conjunction with the drawings wherein like reference numerals refer to corresponding parts in the several views.

DETAILED DESCRIPTION OF THE PREFERRED EMBODIMENTS

Figure 5:
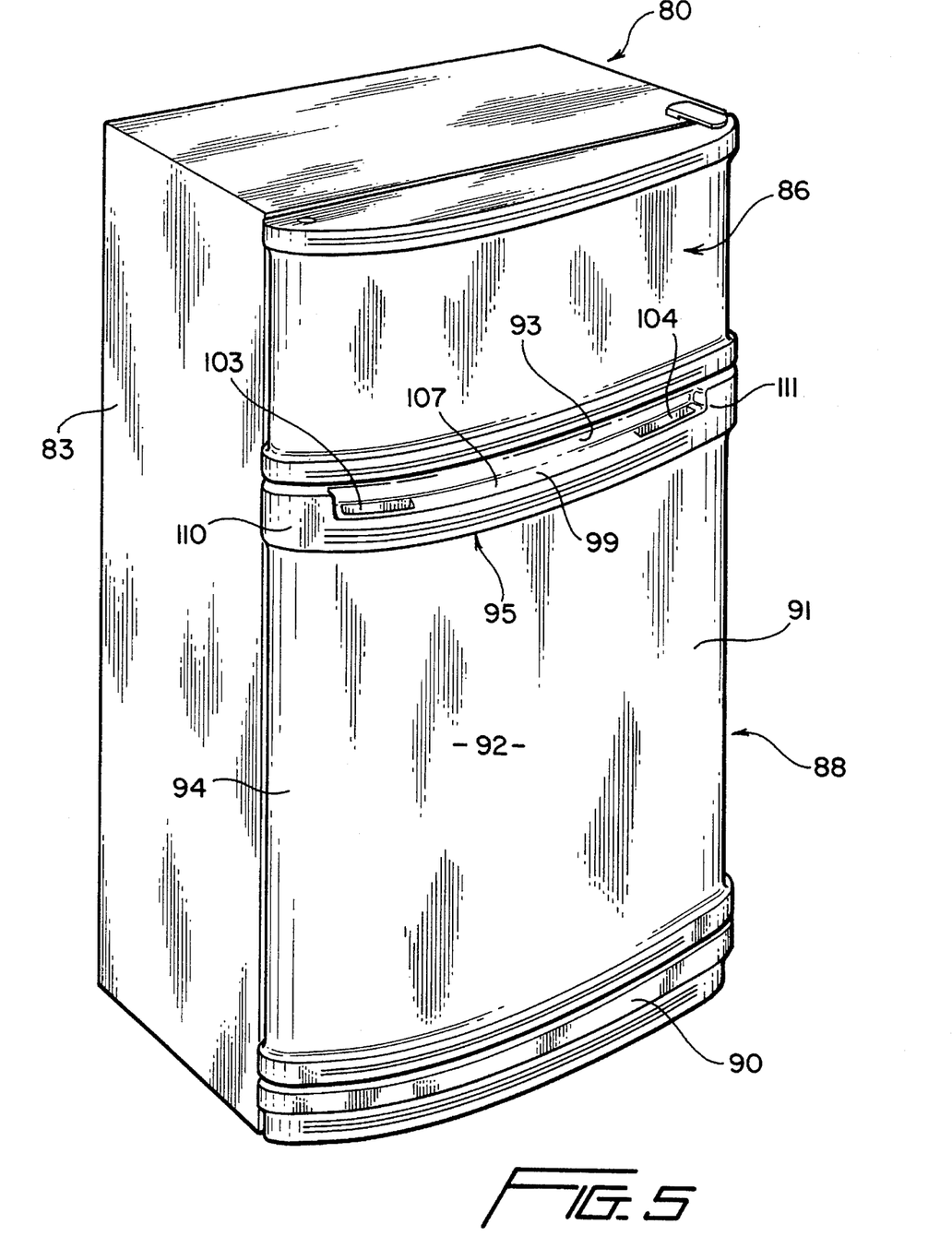
FIG. 5 is a perspective view of a refrigerator incorporating a unitary all-plastic refrigerator door constructed in accordance with the present invention.

FIG. 5 schematically depicts a refrigerator 80 constructed in accordance with the present invention. Refrigerator 80 generally includes a cabinet 83 having various compartments (not shown) formed therein that are selectively closed off by a freezer compartment door 86 and a refrigerator compartment door 88. Refrigerator 80 further includes a kick plate 90. It should be noted that the structure of cabinet 83 and kickplate 90 are not considered part of the present invention and therefore will not be further discussed herein. In addition, it should be noted that, although particular reference will be made to refrigerator compartment door 88 in describing the plastic refrigerator door and its method of manufacture in accordance with the present invention, it should be readily understood that the term "refrigerator door" refers to either a freezer compartment door or a refrigerator compartment door. Therefore, the present invention is equally applicable to combination refrigerator/freezers or dedicated refrigerator or freezer units.

Refrigerator compartment door 88 includes an outer refrigerator door panel 91 and an inner refrigerator door liner (not shown in FIG. 5) as will be more fully discussed below. Outer refrigerator door panel 91 includes an outer wall portion 92 having an associated surface 93 and an inwardly turned annular sidewall 94. Outer wall portion 92 includes a thickened portion 95 that projects slightly outwardly from surface 93. A plateau section 99 includes left and fight recess defining handles 103, 104 that are defined between a central plateau section 107 and left and fight upstanding, thickened end portions 110, 111 of thickened portion 95. As is commonly known in the art, refrigerator door panel 91 can be pivotally mounted about a vertical axis to either the left or fight hand sides of cabinet 83. For this reason, the left and fight halves of refrigerator door panel 91 are preferably symmetrically formed with the left and fight recess defining handles 103, 104. However, it should be readily understood that refrigerator door panel 91 could be designed for use in connection with a refrigerator 80 having a predetermined door opening side wherein only one handle may be required. In addition, although thickened portion 95 is depicted in the preferred embodiment of FIG. 5 to be located at the upmost portion of refrigerator door panel 91, it should be readily understood that thickened portion 95 could be repositioned in order to locate handles 103 and 104 at a desired location and orientation. Since thickened portion 95 projects outwardly from surface 93, the formation of handles 103 and 104 do not detract from the overall energy efficiency of refrigerator door panel 91. In other words, the heat transfer characteristics associated with refrigerator door panel 91 are only increased by the presence of thickened portion 95 as opposed to the inherent decrease in the desired heat transfer characteristics that could be present if a handle was defined by a recess formed inward of surface 93.

In accordance with the preferred embodiment, refrigerator compartment door 88 is made by a thermoforming process which advantageously enables the particular shape of refrigerator door panel 91 to be readily altered if desired. In addition, in accordance with the method of thermoforming a refrigerator door in accordance with the present invention, refrigerator compartment door 88 can be advantageously made from two plastic sheets utilizing a single molding apparatus and with a liner associated with refrigerator compartment door 88 being formed on a male mold member as now will be discussed with reference to FIGS. 6-13.

Figure 6:
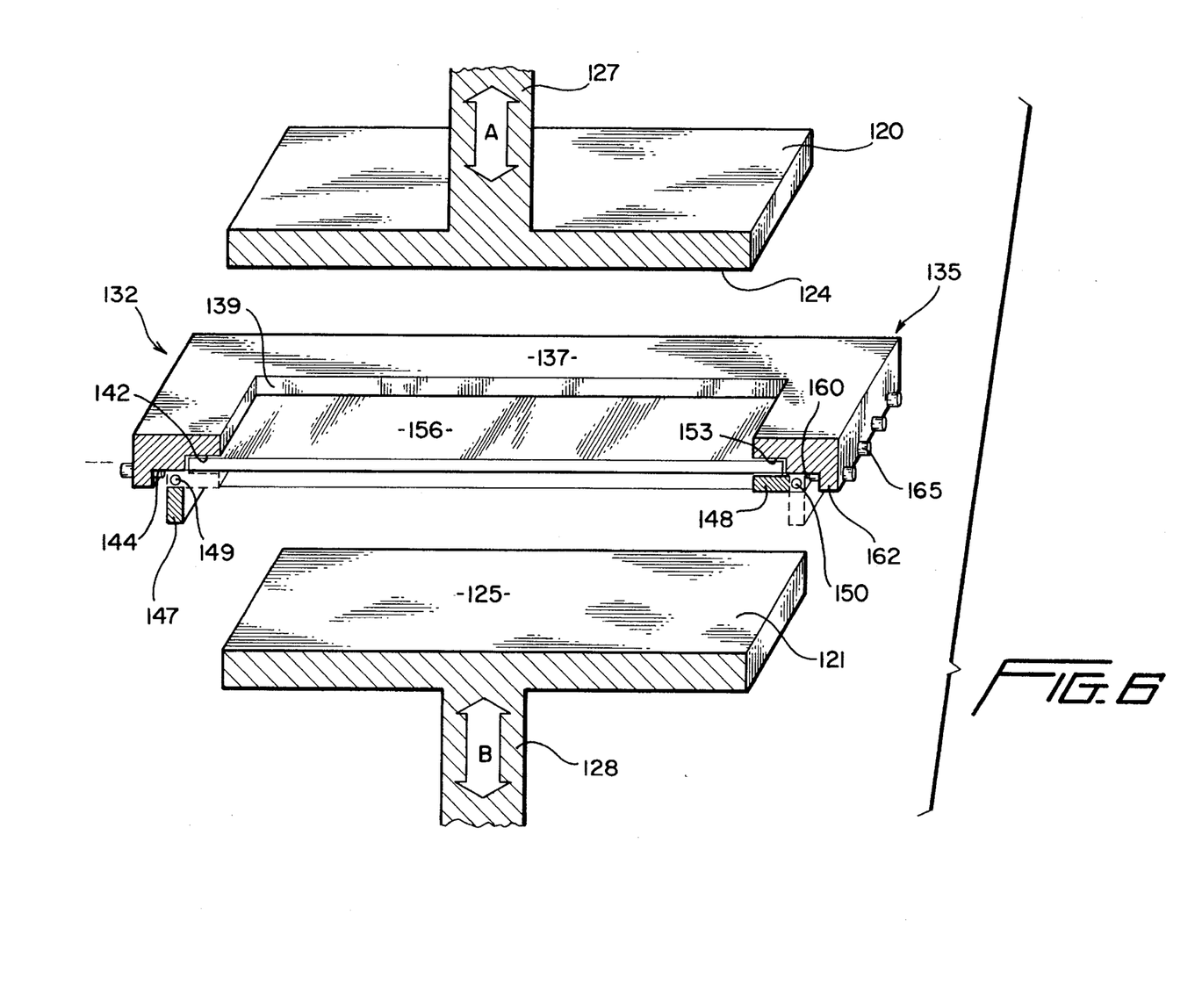
FIG. 6 is a partial cross-sectional view of various components used in manufacturing of the refrigerator door of FIG. 5.

Initial reference will be made to FIG. 6 in describing a few of the basic components utilized in the process of thermoforming refrigerator compartment door 88. The thermoforming apparatus includes upper and lower platens 120, 121 each of which defines support surfaces 124 and 125 respectively. Upper and lower platens 120, 121 are integrally formed and are fixedly secured to control arms 127 and 128 respectively. Control arms 127 and 128 form part of or are attached to linear actuators (not shown), such as hydraulic, electric or pneumatic actuators, in order to reposition upper and lower platens 120, 121 vertically as depicted in FIG. 6 and represented by arrows A and B. The basic shifting arrangement for upper and lower platens 120, 121 has not been detailed in the drawings since such an arrangement is commonly known in the art of thermoforming articles and is therefore not considered an inventive aspect of the present invention.

FIG. 6 also illustrates a sheet supporting and shuttling member 132 utilized in the thermoforming method of the present invention. Sheet supporting and shuttling member 132 includes a clamping frame 135 having an upper annular frame member 137 provided with a central cut-out portion 139. Central cut-out portion 139 is sized in relation to the size of the molds that are attached to the upper and lower platens 120 and 121 so as to be slightly larger than the molds whereby the molds can be positioned entirely within central cut-out portion 139. Upper annular frame member 137 is provided with first and second undercut portions 142 and 144. As shown in FIG. 6, a pair of sheet retaining members 147, 148 are pivotally attached by means of rods 149, 150 to second undercut portion 144 of upper annular frame member 137. Through rods 149, 150, sheet retaining members 147, 148 can pivot between a sheet releasing position as indicated by the solid lines for sheet retaining member 147 on the left side of the upper annular frame member 137 in FIG. 6 and a sheet clamping position as illustrated by the position of sheet retaining member 148 in solid lines on the right side of FIG. 6. When sheet retaining members 147, 148 are in their respective clamping positions, an annular space 153 is defined between upper annular frame member 137 and sheet retaining members 147, 148 which is used to retain a plastic sheet 156. In this manner, plastic sheet 156 can be selectively supported by sheet supporting and shuttling member 132 within annular space 153 or can be released by pivoting members 147, 148. It should be noted that although only two sheet retaining members 147, 148 are depicted in FIG. 6 due to the view taken, additional sheet retaining members could be provided on the other opposing sides of sheet supporting and shuttling member 132. In particular, these additional sheet retaining members may be highly desired depending upon the required thickness of plastic sheet 156. In the preferred embodiment, for support purposes, all four sides of clamping frame 135 are provided with pivotable sheet retaining members.

Each sheet retaining member 147, 148 includes an outermost terminal end 160 that is spaced inward a predetermined distance from a downwardly extending portion 162 of upper annular frame member 137. This predetermined distance permits each sheet retaining member 147, 148 to freely pivot about its respective rod 147, 149. In order to prevent undesired pivoting of each sheet retaining member 147, 148, a locking arrangement is provided between upper annular frame member 137 and the sheet retaining members 147, 148. In one embodiment, the locking arrangement includes a plurality of locking pins 165 that extend through holes (not labeled) formed in downwardly extending portion 162 of upper annular frame member 137. Locking pins 165 can abut outermost terminal end 160 of a respective sheet retaining member 147, 148 or could actually extend into bores (not shown) formed in the outermost terminal end 160 of each sheet retaining member 147, 148. Locking pins 165 are slidably mounted within the through holes provided in downwardly extending portion 162 of upper annular frame member 137 and can be spring biased to a locking position.

Figure 7:
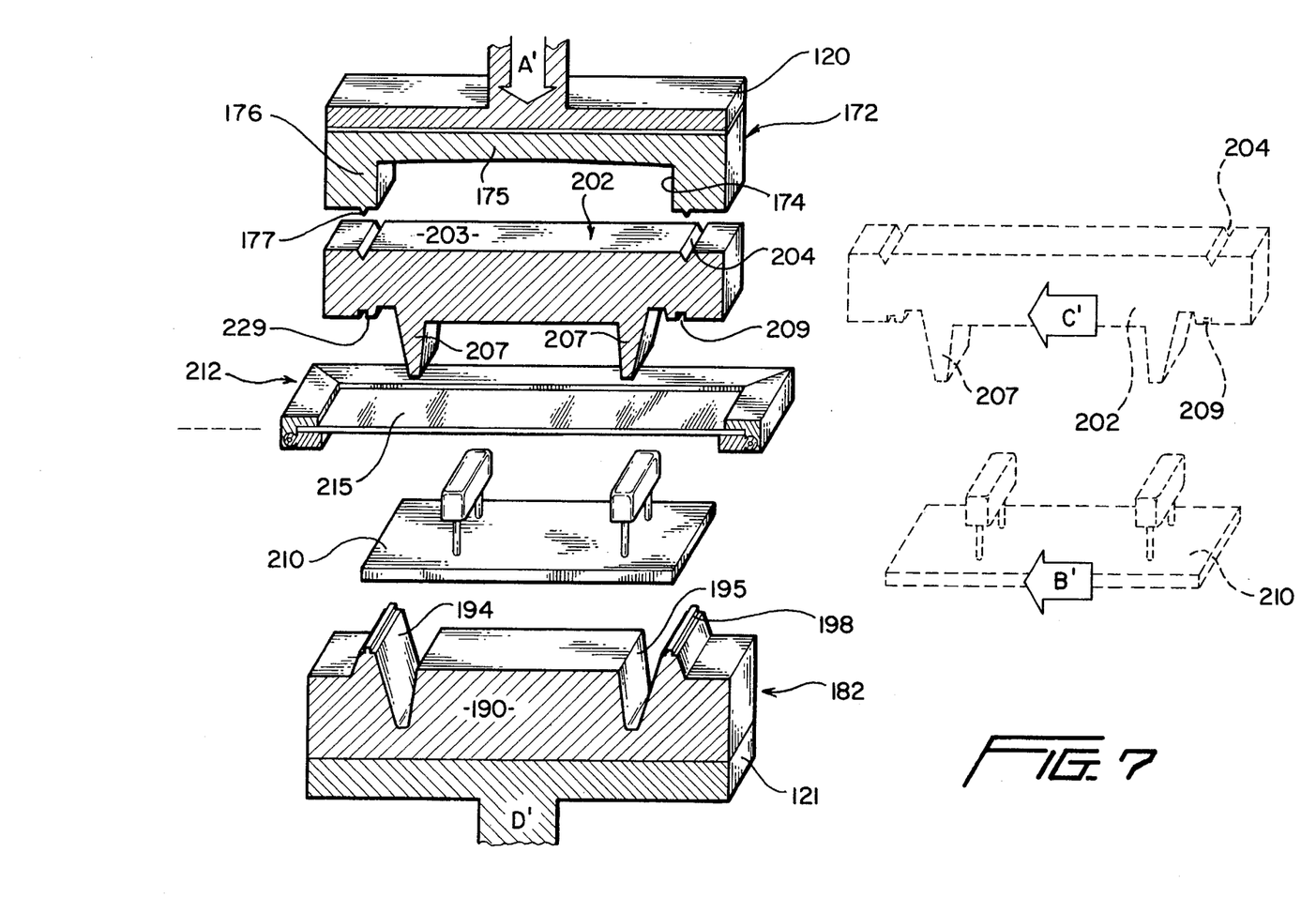
FIG. 7 illustrates an initial stage in the manufacturing method of the present invention to produce the refrigerator door of FIG. 5.

Reference will now be made to FIG. 7 in describing an initial thermoforming stage in accordance with the present invention. For forming of refrigerator compartment door 88, upper platen 120 has secured thereto, by any means known in the art such as threaded fasteners (not shown) that extend into support surface 124, a first female mold unit indicated at 172. First female mold unit 172 includes an internal cavity 174 defined by a base 175 and an annular pillar 176. Annular pillar 176 is formed with an outwardly extending, tapered tongue element 177. A second female mold unit generally designated by numeral 182 is likewise fixedly secured upon support surface 125 of lower platen 121. An integral part of second female mold unit 182 is a cradle member 190. Cradle member 190 is formed with first and second dike receiving depressions 194 and 195. Cradle member 190 also includes an annular recess accommodating member 198.

During an initial stage of thermoforming refrigerator compartment door 88, a male mold member 202 is shuttled between the first and second female mold units 172 and 182. Male mold member 202 can be shuttled in the direction of arrow C' by a type of shuttling mechanism that can include, for example, a track and an actuator (not shown) attached to the upper plateau 120. Of course, the manner in which male mold member 202 is repositioned during the thermoforming method of the present invention can be performed by various types of conveying assemblies known in the art. Male mold member 202 is formed, on an upper surface 203 thereof, with a tapering annular groove 204. When male mold member 202 is shuttled between the first and second female mold units 172, 182 and first female mold unit 172 is shifted toward second female mold unit 182 and the cradle member 190 in the direction of arrow A', male mold member 202 mates with first female mold unit 172 with tongue element 177 extending within tapering annular groove 204 in order to locate male mold member 202 relative to first female mold unit 172. It should be understood that other alternate locating methods than tongue element 177 and annular groove 204 could be used to locate male mold member 202 relative to the first female mold unit 172. Male mold unit 202 is also provided with a plurality of dike forming members 207, as well as an annular recess 209 spaced outwardly from dike forming members 207. At this point, it should be noted that annular recess 209 is only depicted in FIG. 7 for clarity of the drawings.

Figure 7A:
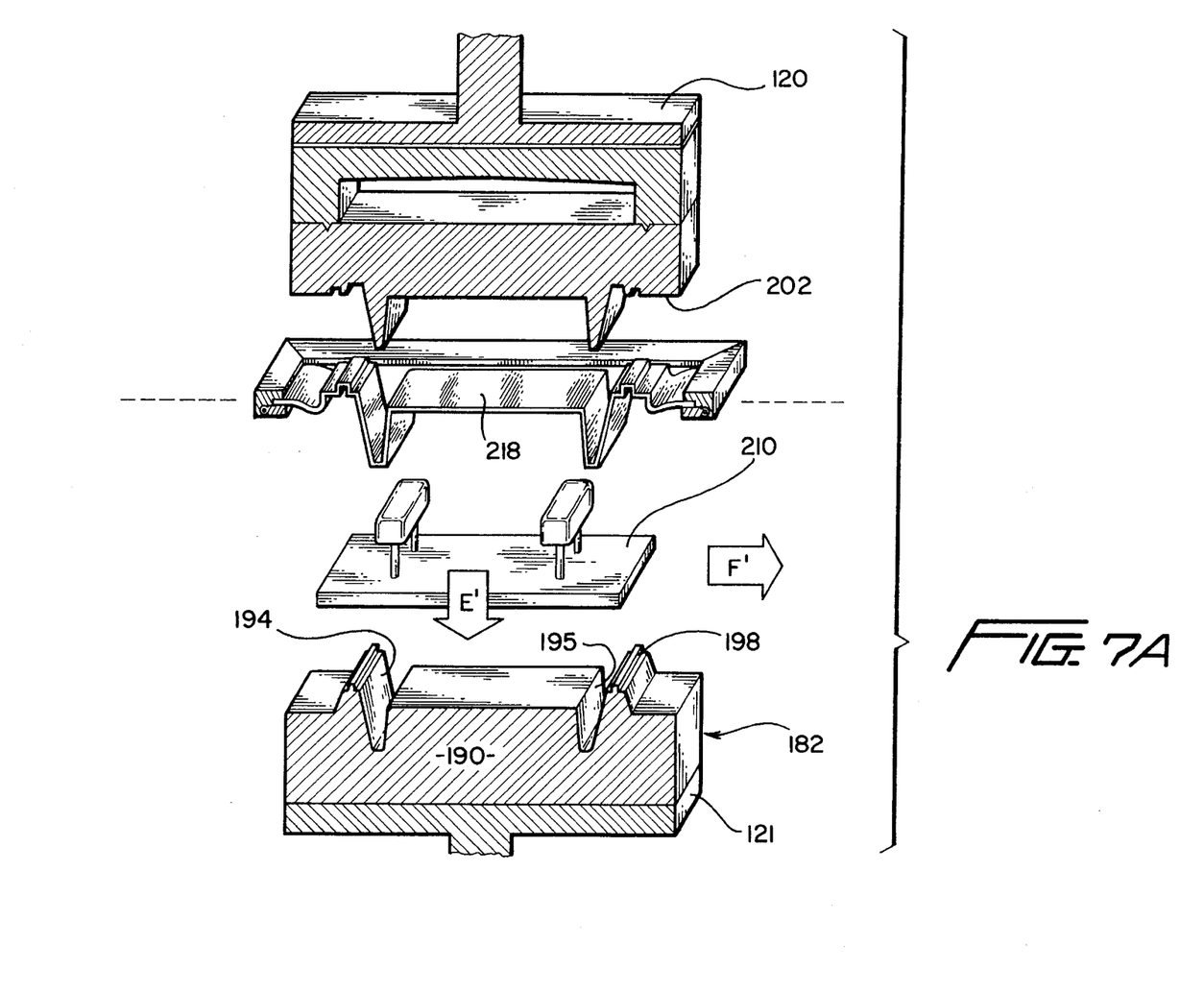
FIG. 7A is a view of the molding apparatus of FIG. 7 in another stage.

Shuttled into position, as best shown in FIG. 7, generally simultaneously with the male mold member 202 and in the direction of arrow B' is a plug assist 210. The plug assist 210 can be shuttled on a track and moved by an actuator attached to the lower platen 121. Also simultaneous with the shuttling of male mold member 202 between first and second female mold units 172, 182 and cradle member 190, a first sheet supporting and shuttling member 212 is shuttled between male mold member 202 and the cradle member 190 of second female mold unit 182. First sheet supporting and shuttling member 212 carries a first plastic sheet 215. At this point, first female mold unit 172 is shifted in the direction of arrow A' and, with the application of heat and a vacuum through male mold member 202 in a manner known in the art of thermoforming, first plastic sheet 215 is vacuumed onto male mold member 202. In coordination, plug assist 210 is moved in the direction of arrow D' to assure that plastic sheet 215 conforms to the desired shape as defined by male mold member 202. As shown in FIG. 7A, the plug assist 210 is then retracted in the direction of arrow E' and is shuttled out in the direction of arrow F' (see FIG. 7A). By this process, an inner refrigerator door liner 218 is formed on male mold member 202. At this point, it should be noted that inner refrigerator door liner 218 is not shown on male mold member 202 in FIG. 7A for clarity only. Due to the configuration of male mold member 202, refrigerator door liner 218 is formed with dike portions 220, 221 and an annular flange portion 223. As we discuss more fully below, annular flange portion 223 will be later bent to form an inturned edge 225 and refrigerator door liner 218 is later trimmed at inturned edge 225 (see FIG. 14). An annular recess 227 (shown only on one side of FIG. 8 for clarity) is also formed in annular flange portion 223 during the vacuum forming process.

Figure 8:
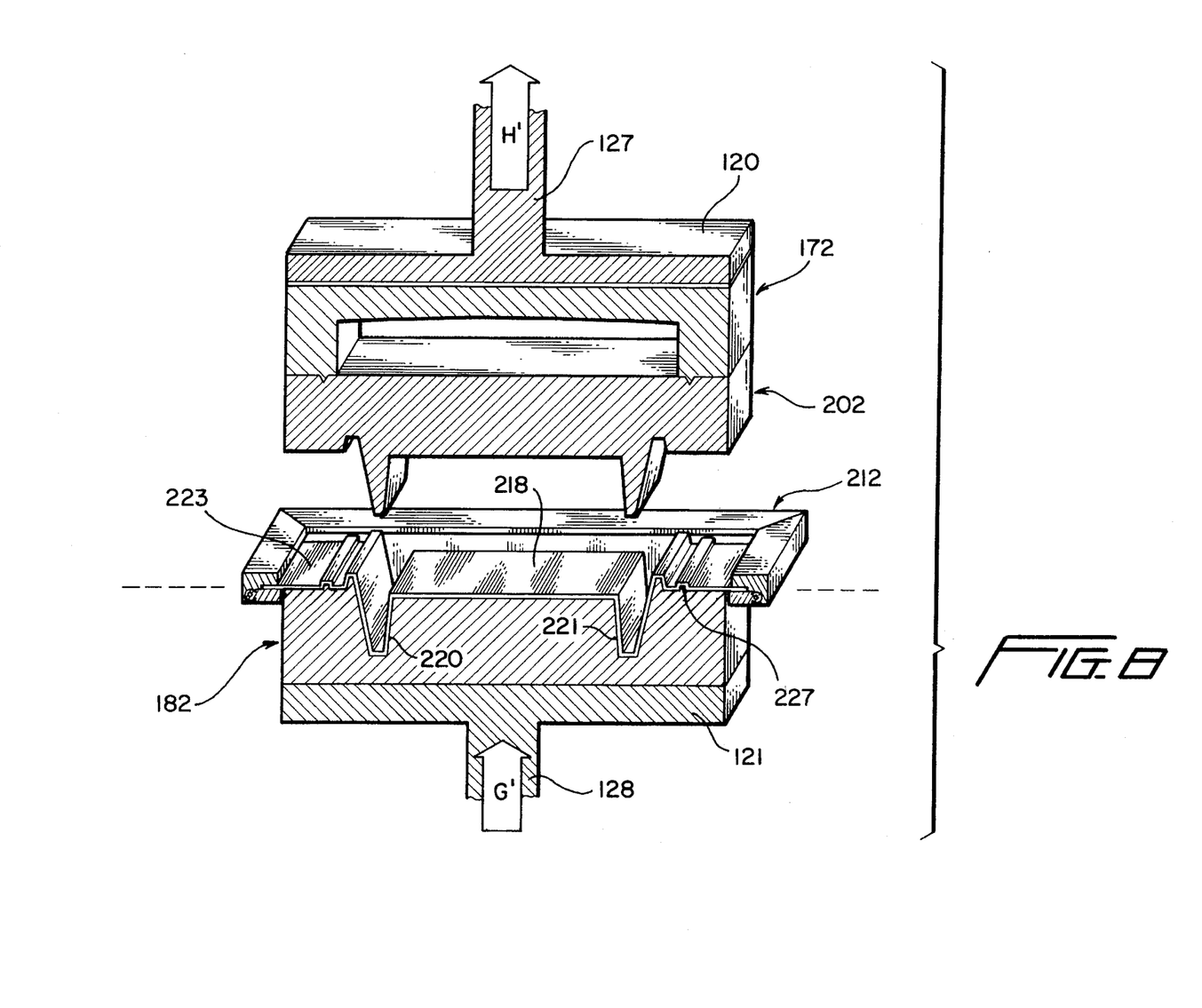
FIG. 8 is a partial schematic view of the molding apparatus of FIG. 7 in a subsequent manufacturing stage.
Figure 9:
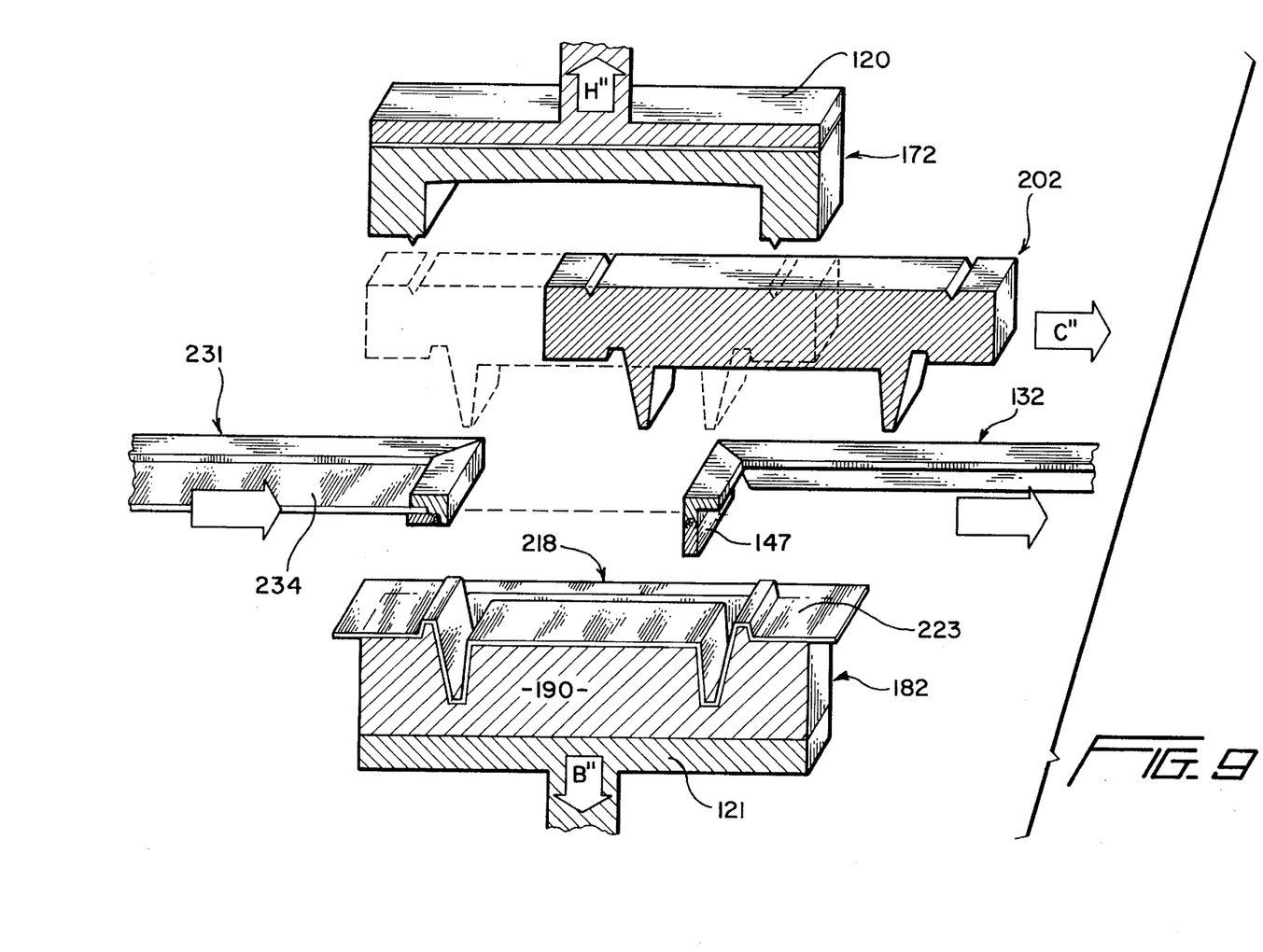
FIG. 9 is a partial schematic view of the molding apparatus of FIG. 7 in a still further manufacturing stage.
Figure 10:
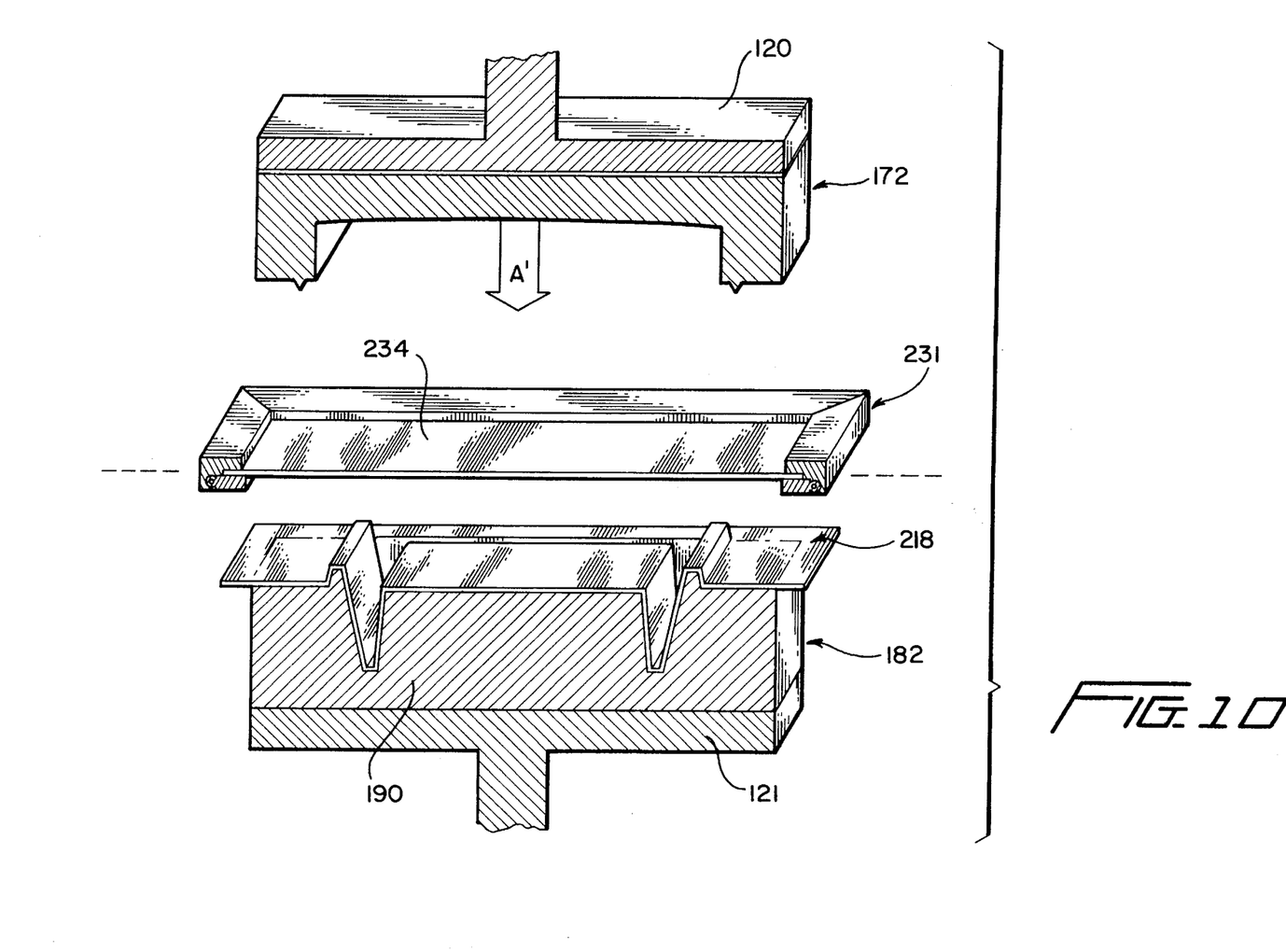
FIG. 10 is a partial schematic view of the molding apparatus utilized in accordance with the present invention in an initial refrigerator door panel manufacturing stage.
Figure 11:
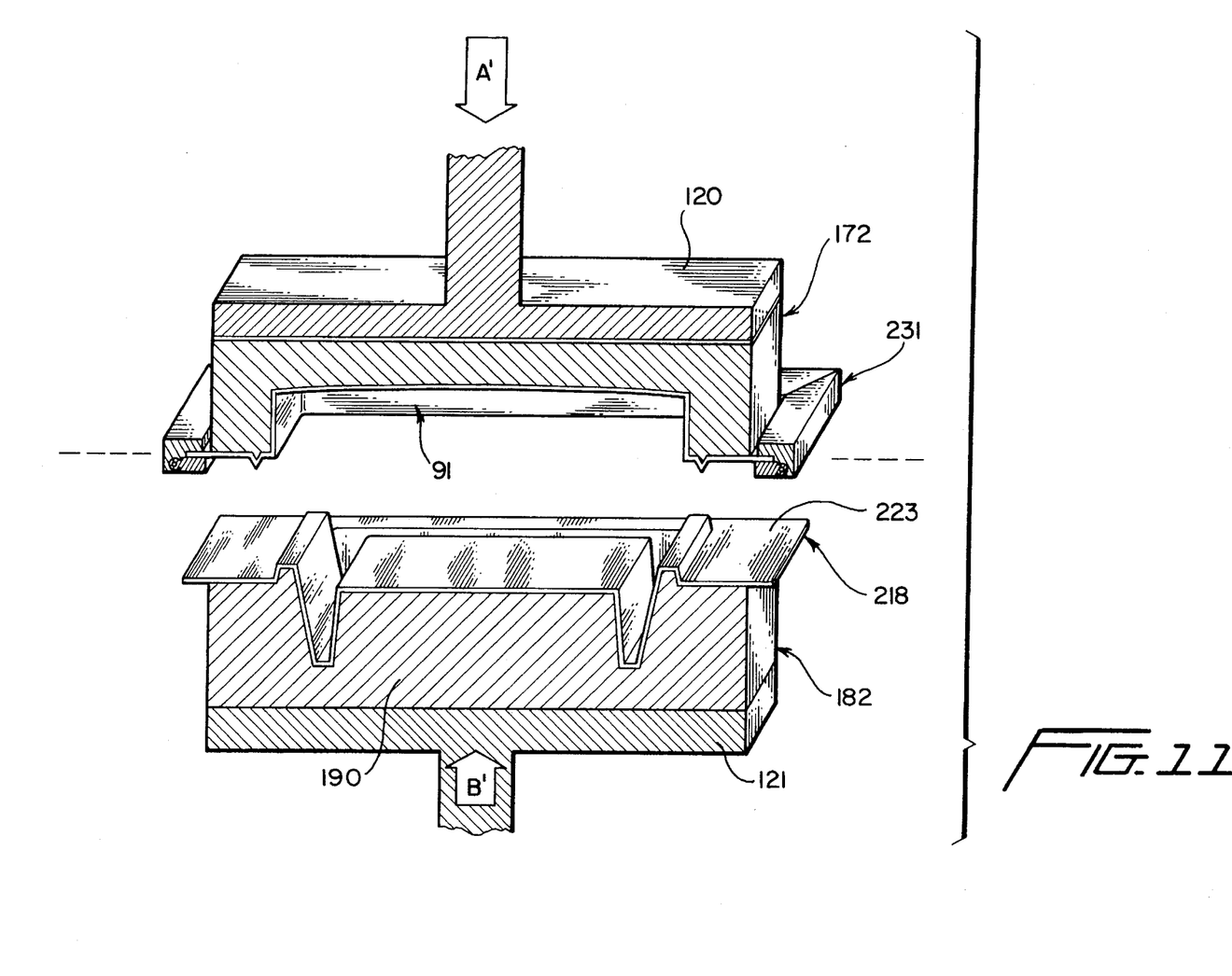
FIG. 11 is a partial schematic view of the molding apparatus utilized in accordance with the present invention is a subsequent refrigerator door panel manufacturing stage.
Figures 12, 13:
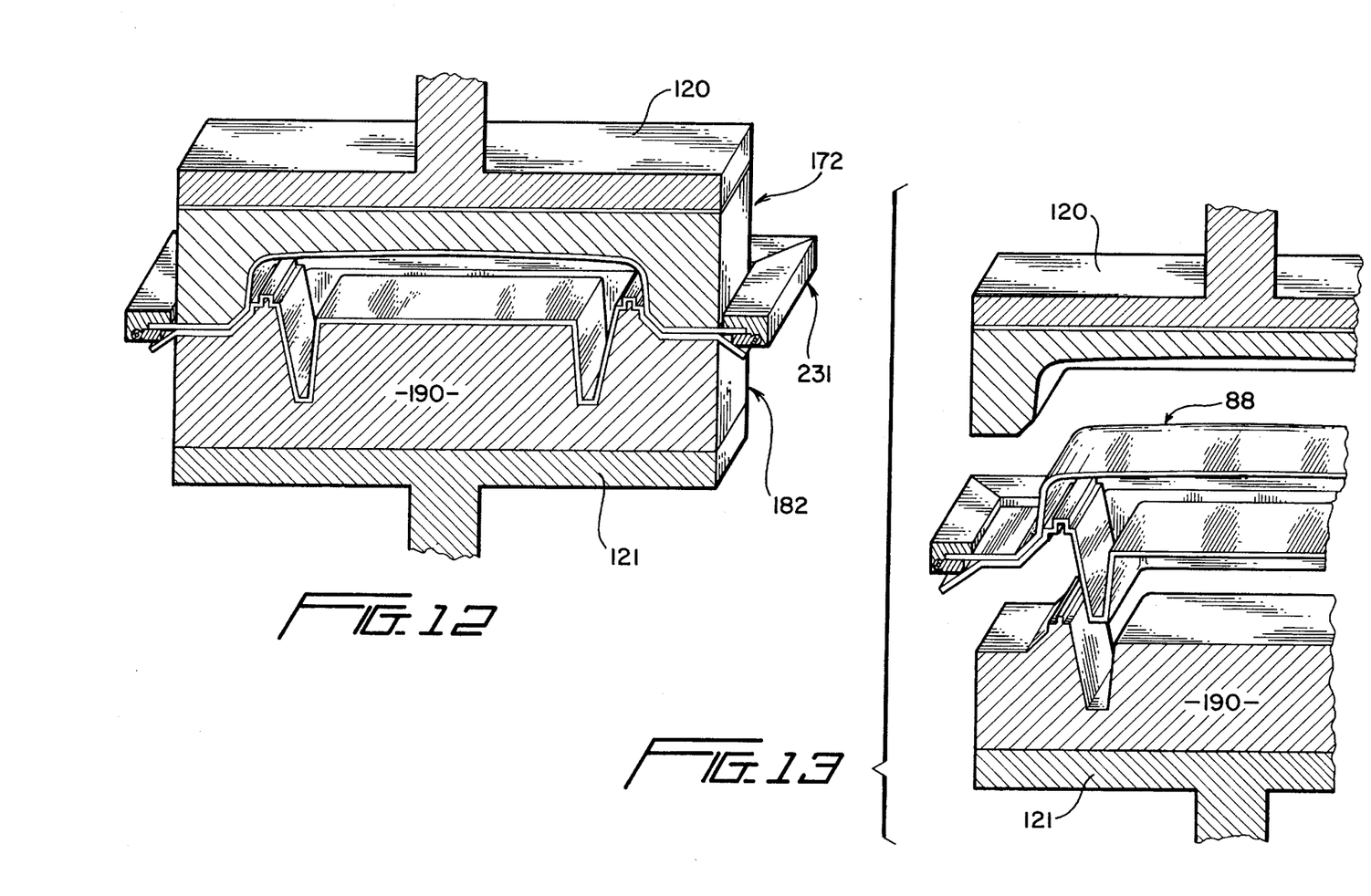
FIG. 12 is a partial schematic view of the molding apparatus in a final refrigerator door molding stage.
FIG. 13 is a partial schematic view of the molding apparatus in an open state following completion of the molding operation.

When first plastic sheet 215 is appropriately formed and a cooling process has taken place, female mold 182 and platen 121 is shifted in the direction of arrow G' and upper platen 120 is shifted in the direction of arrow H' as shown in FIGS. 8 and 9 and sheet retaining members 147, 148 are shifted to their release positions. At this point, lower platen 121 is shifted downwardly in the direction of arrow B" in FIG. 9 wherein refrigerator door liner 218 is retained within cradle member 190. Although not shown in detail, male mold member 202 preferably includes tab portions 229 that can pivot relative to the remainder of male mold member 202 in order to enable refrigerator door liner 218 to be removed from annular recess 209 and male mold member 202. Next, male mold member 202 and first sheet supporting and shuttling member 212 are shuttled out from between first and second female mold units 172, 182. Thereafter, a second sheet supporting and shuttling member 231 shuttles a second plastic sheet 234 between first and second female mold units 172, 182. When second sheet supporting and shuttling member 231 is in place between first and second female mold units 172, 182, upper platen 120 is shifted toward lower platen 121 as illustrated in FIG. 10 so as to come into contact with second plastic sheet 234 and a vacuum is applied through first female mold unit 172 in a manner known in the art such that second plastic sheet 234 is drawn into first female mold unit 172 in order to form outer refrigerator door panel 91 (see FIG. 11). As soon as the vacuum is applied, lower platen 121 is extended such that inner refrigerator door liner 218 and outer refrigerator door panel 91 contact each other as shown in FIG. 12. With the application of heat, the inturned edge 225 of inner refrigerator door liner 218 is melted to the inwardly turned annular sidewall portion 94 of outer refrigerator door panel 91 (also see FIG. 14). Once these two portions of refrigerator compartment door 88 are joined, pressure is immediately applied through a blow pin (not shown) into the interior of the newly formed refrigerator compartment door 88 to enhance the details of outer refrigerator door panel 91. Next, both upper and lower platens 120, 121 are retracted and the final product, which is still attached to second sheet supporting and shuttling member 231, is shuttled out from between first and second female mold units 172, 182 as shown in FIG. 13.

Figure 14:
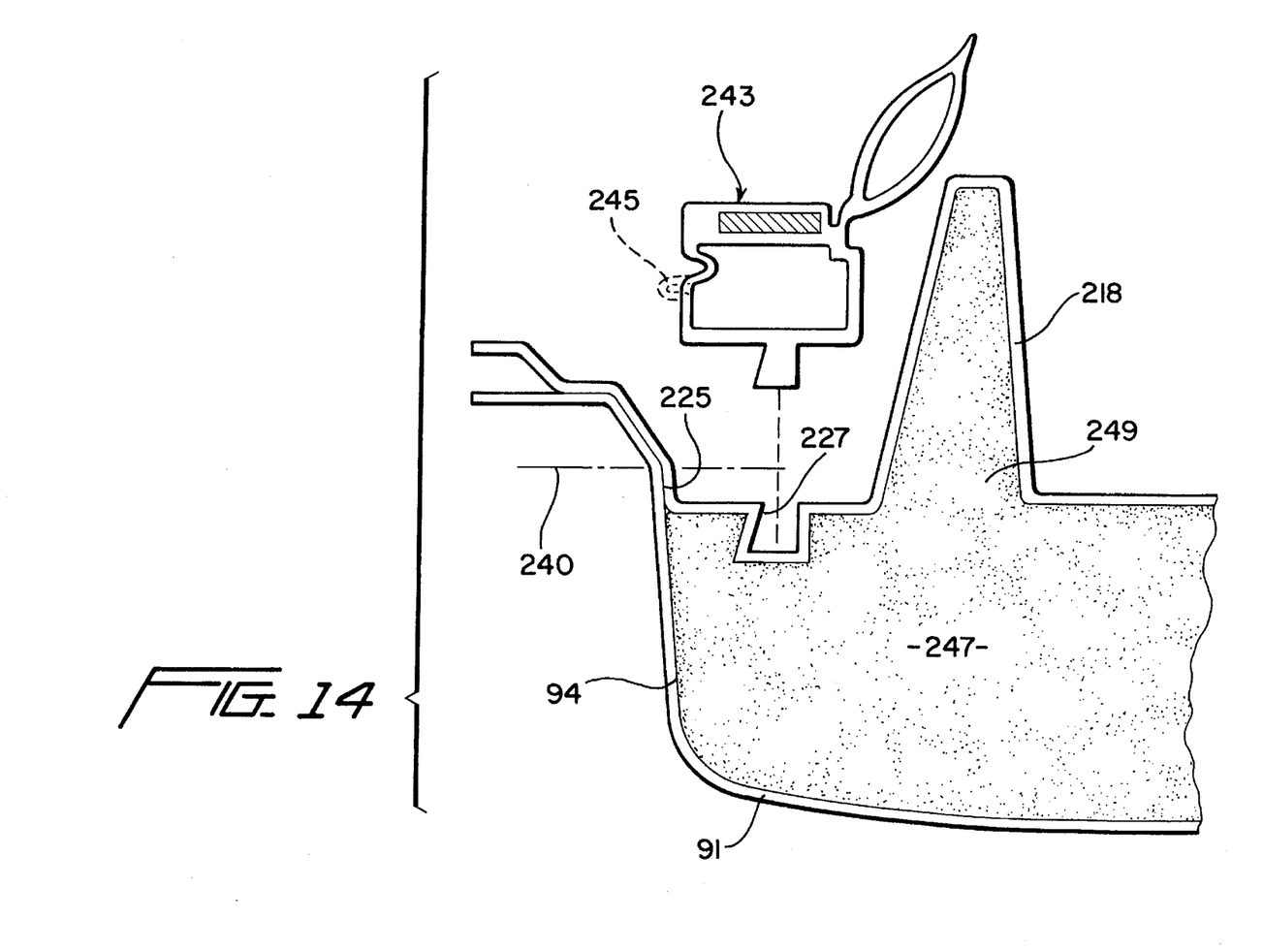
FIG. 14 is an enlarged sectional view of a portion of the molded refrigerator door of the present invention.

The interconnection between inturned edge 225 of inner refrigerator door liner 218 and inwardly turned annular sidewall 94 of outer refrigerator door panel 91 is perhaps best shown in the enlarged view of FIG. 14. Once the thermoformed refrigerator compartment door 88 is removed from first and second female mold units 172, 182, this joined area between inner refrigerator door liner 218 and outer refrigerator door panel 91 is trimmed along line 240 which can then be rounded or beveled. When assembled to the cabinet 83, the trim line 240 is hidden from frontal and side view and a seam defined by the joined area is located between annular side wall portion 94 and dike portions 220 and 221 and extends substantially perpendicular to an outer wall portion of door panel 91 as clearly shown in this figure.

In accordance with the present invention, a gasket, generally indicated at 243 in FIG. 14, is adapted to be press fit within annular recess 227. To further hide trim line 240, gasket 243 may be designed to include a portion 245, as shown in FIG. 14, that overlies trim line 240 and which is flush with sidewall 94. Once gasket 243 is secured, a unitary, aesthetically appealing all-plastic refrigerator door is formed. FIG. 14 also illustrates that, in accordance with the preferred embodiment of the invention, the internal chamber 247 defined between outer refrigerator door panel 91 and inner refrigerator door liner 218 can be filled with a heat insulating material. In the preferred embodiment, foam 249 is injected into internal chamber 247 and extends even into dike portions 220, 221 in order to provide, in addition to enhanced thermal specifications for refrigerator compartment door 88, additional structural rigidity without significantly increasing the weight of refrigerator compartment door 88.

Figure 15:
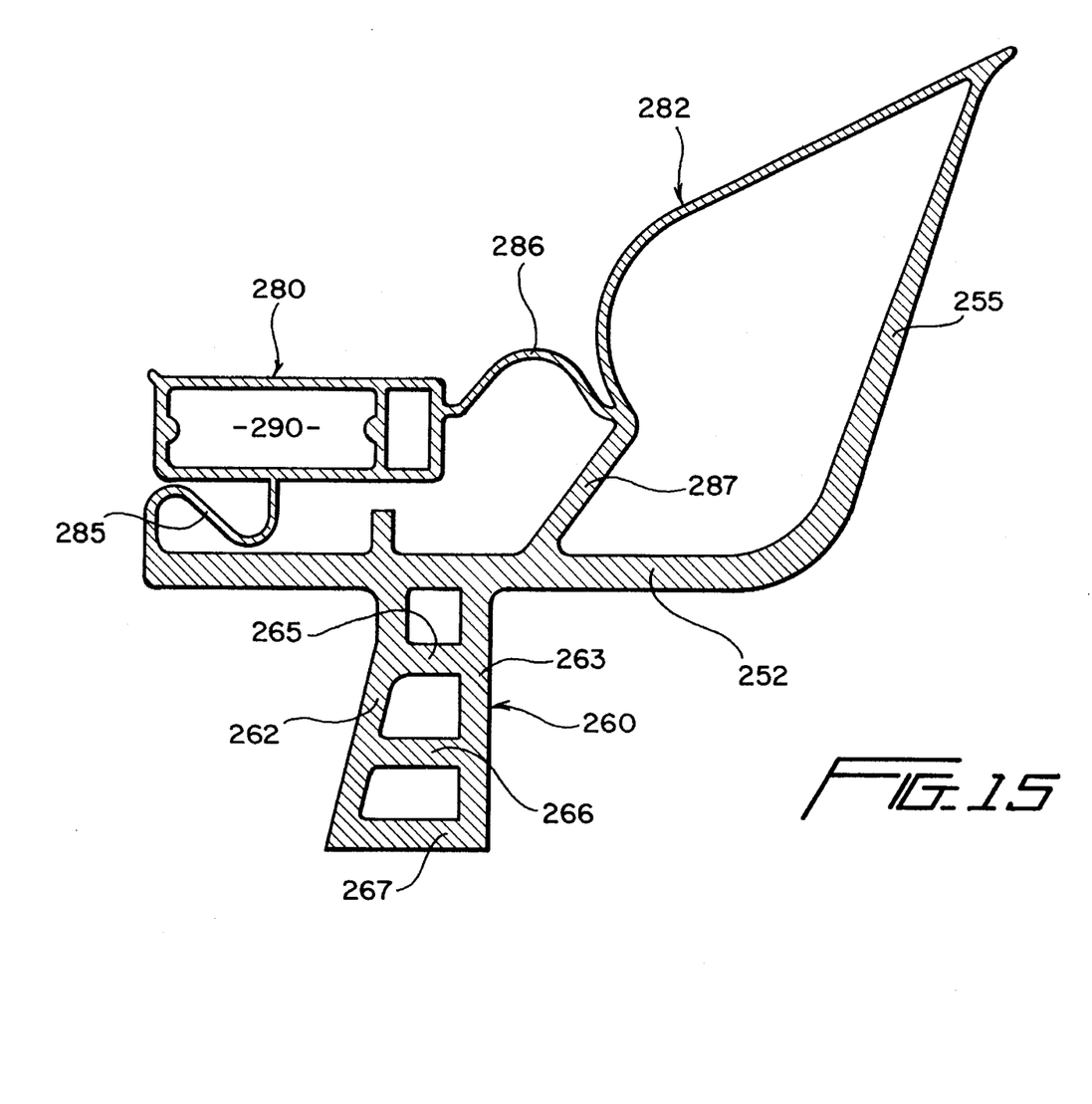
FIG. 15 is a cross-sectional view of a preferred gasket construction incorporated in the refrigerator door of the present invention.

FIG. 15 depicts a preferred embodiment for the gasket utilized with refrigerator compartment door 88. According to this preferred embodiment, the gasket includes a base 252 terminating in an upwardly angling portion 255 at one end thereof. Base 252 is formed with an elongated connection member 260 composed of sidewall portions 262, 263 joined by a plurality of spaced, interconnecting portions 265–267. The gasket is adapted to be mounted within annular recess 227 by press fitting connection member 260 therein. The undercut formed by sidewall portion 262 functions to hold the gasket in place. The spaces provided between sidewall portions 262, 263 and interconnecting portions 265–267 enable connection member 260 to be readily deflected inwardly upon insertion of connection member within annular recess 227 in order to facilitate in the interconnection between the gasket and refrigerator compartment door 88.

For sealing purposes, the gasket includes a primary seal member generally indicated at 280 and a secondary seal member generally indicated at 282. Primary seal member 280 is attached to one end of base 252 by a first flap member 285 and is attached to an intermediate portion of base 252 by means of a second flap member 286 and an enlarged attachment member 287. Secondary seal member 282 is also secured to base 252 at one end through attachment member 287 and at another end thereof to upwardly angling portion 255. Primary seal member 280 is adapted to engage the face (not labeled) of cabinet 83 and secondary seal member 282 is adapted to engage a liner of cabinet 83 when refrigerator compartment door 88 is closed. If cabinet 83 is made from metal, primary seal member 280 is preferable provided with an internal chamber 290 which houses a magnet (not shown) for enhancing the sealing characteristics in a manner known in the art.

From the above discussion, it should be readily apparent that forming an all-plastic refrigerator door in accordance with the present invention minimizes the number of manufacturing steps necessary and results in reduced manufacturing costs. In addition, since the refrigerator door is completely made from plastic, it will be a more durable than conventional metal/plastic doors and can be more versatile in design. One of the key benefits to the manufacturing process is that the door can be manufactured such that the joining seam whereat the outer door panel meets the inner liner faces toward the inside of the refrigerator. Due to this positioning of the seam, the gasket could be advantageously designed to cover the seam so as to provide an extremely aesthetically appealing overall assembly.

Although various materials could be utilized in connection with the present invention to form the refrigerator door, in the preferred embodiment, outer refrigerator door panel 91 is composed of a high impact polystyrene layer of approximately 95–98 mils in thickness having an acrylic cap layer of polymethylmethacrylate in the order of 2–5 mils. The refrigerator door liner 218 is preferably formed of high impact polystyrene. In addition, a foam barrier layer of a styrenic alloy may be used on the inside surface of both the outer refrigerator door panel 91 and the inner refrigerator door liner 218 when certain corrosive foams are injected within internal chamber 247. It is also possible to use polyvinylchloride as the material for either of these components. If polyvinylchloride is utilized, no cap layer or foam barrier will be necessary. However, the use of the polystyrene over the polyvinylchloride is preferred based on cost factors. Instead of the polymethylmethacrylate used for the cap layer, it is also possible to utilize styrenemethylmethacrylate.

As indicated above, the refrigerator door constructed in accordance with the invention will be more energy efficient than conventional doors utilizing metal panels which inherently conduct more heat into the unit. This efficiency characteristic is further enhanced by locating the thickened portion of the door that contains the handles closer to the periphery of the door than the dike. Obviously, the plastic also provides a corrosion resistant door that does not require painting. When foam is injected within the door, the door shells are inherently stronger, even more so than the conventional design.

Although described with respect to a preferred embodiment of the invention, it should be readily understood that various changes and/or modification can be made to the present invention without departing from the spirit thereof. For instance, the specific manner in which the gasket is attached to the thermoformed door can readily varied without departing from the spirit of the invention. An important aspect of the method of manufacturing the refrigerator door as described above is that it enables a particular positioning of the joining seam of the outer door panel and the refrigerator liner wherein the seam is located in a position where it cannot be viewed in the normal door closed posture to provide an aesthetically appealing configuration. In general, the invention is only intended to be limited by the scope of the following claims.

We claim:

1. A unitary plastic refrigerator door comprising:

a thermoformed outer refrigerator door panel including an outer wall portion and an inwardly turned, annular sidewall portion; and a thermoformed inner refrigerator door liner integrally formed with at least one dike portion and an annular flange portion positioned outwardly of said at least one dike portion, said annular flange portion including an inturned edge portion being joined with the annular sidewall portion of said outer refrigerator door panel along a seam located between said annular sidewall portion and said at least one dike portion, said seam extending substantially perpendicular to said outer wall portion of said outer refrigerator door panel, wherein an internal chamber is defined between said outer door panel and said inner refrigerator door liner, said refrigerator door further including a filler material located throughout said internal chamber.

2. A unitary refrigerator door as claimed in claim 1, wherein said seam is located inward of said annular sidewall portion.

3. A unitary refrigerator door as claimed in claim 2, wherein said seam is substantially parallel to said annular sidewall portion.

4. A unitary refrigerator door as claimed in claim 1, further comprising:

a door gasket; and means for securing said door gasket to the annular flange portion of said refrigerator door.

5. A unitary refrigerator door as claimed in claim 4, wherein said securing means comprises at least one recess formed in the annular flange portion of said inner refrigerator door liner and at least one connection element carried by said gasket that is adapted to be press-fit into said at least one recess.

6. A unitary refrigerator door as claimed in claim 4, wherein said door gasket includes a portion that extends over and visibly covers said seam.

7. A unitary refrigerator door as claimed in claim 1, wherein the outer wall portion of said outer refrigerator door panel includes a thickened portion and a handle member formed in said thickened portion.

8. A unitary refrigerator door as claimed in claim 7, wherein said refrigerator door has an associated periphery, said handle member being located closer to said periphery than said at least one dike portion of said inner refrigerator door liner.

* * * * *